United States Patent [19]

Mintus et al.

[11] Patent Number: 5,049,802
[45] Date of Patent: Sep. 17, 1991

[54] CHARGING SYSTEM FOR A VEHICLE

[75] Inventors: Robert T. Mintus, Warren; John C. Paine, Chardon, both of Ohio

[73] Assignee: Caterpillar Industrial Inc., Mentor, Ohio

[21] Appl. No.: 487,001

[22] Filed: Mar. 1, 1990

[51] Int. Cl.⁵ ............................ H02J 7/00; E04H 6/00
[52] U.S. Cl. ............................................. 320/2; 320/8; 414/227
[58] Field of Search ................... 320/90, 2, 5, 56, 44, 320/8

[56] References Cited

U.S. PATENT DOCUMENTS

| | | | |
|---|---|---|---|
| 3,169,733 | 2/1965 | Barrett, Jr. | 240/30 |
| 3,603,860 | 9/1971 | Johnson | 320/2 |
| 3,898,547 | 8/1975 | Poole | 320/5 X |
| 3,904,947 | 9/1975 | Crews | 320/56 X |
| 4,012,681 | 3/1977 | Finger et al. | 320/44 X |
| 4,282,475 | 8/1981 | Milton | 320/6 |
| 4,347,472 | 8/1982 | Lemelson | 320/2 |
| 4,496,896 | 1/1985 | Melocik et al. | 320/2 |
| 4,532,418 | 7/1985 | Meese et al. | 320/2 |
| 4,672,280 | 6/1987 | Honjo | 414/227 X |
| 4,679,152 | 7/1987 | Perdue | 364/513 |
| 4,777,416 | 10/1988 | George et al. | 318/568 |

OTHER PUBLICATIONS

French Article, Titled: "La manutension Robotiser", by: Marc Ferretti, dated Apr., 1984, pp. 65-73.
Japanese Patent Abstract No. 60-63440(A), Appln. No. 58-171451, Inventor: T. Takenaka dated Apr., 1985.
French Abstract 1,270,274, by: Barrett Electronics Corporation, dated: Jul. 17, 1961.

Primary Examiner—R. J. Hickey
Attorney, Agent, or Firm—David M. Masterson

[57] ABSTRACT

Automated charging systems for vehicles having rechargeable batteries are in common use today. Such systems typically have exposed contacts or the need for additional circuitry to move the contacts. The subject system includes circuitry which allows the charge receiving member to be only connected to the battery during charging. The charging system produces a charging signal in response to a low battery. A microprocessor receives the charging signal and responsively produces a "pulse" signal. A second transistor switch receives the "pulse" signal and responsively energizes a charging contactor coil. In response to the charging contactor coil being energized, contacts controllably block power from the battery to the motor and pass power from the receiving member to the battery.

19 Claims, 3 Drawing Sheets

Fig_2

CHARGING SYSTEM FOR A VEHICLE

DESCRIPTION

1. Technical Field

This invention relates generally to a system for automatically charging the battery on a vehicle and, more particularly, to a system for disconnecting the battery from the vehicle motor and simultaneously connecting a charge receiving member to the battery during charging.

2. Background Art

Recharging the batteries of an electrically powered vehicle is often difficult, disruptive, and time consuming. A common practice is to recharge the batteries only when the vehicle is to be out of service for an extended period or to replace the batteries after a work shift. The problem associated with these methods is that they require manual operations to perform the functions. Do to human error, the cables attached to the battery while charging could be connected backwards or shorted to the frame and damage the battery, the vehicle, or the charging unit.

The utility of such vehicles is partially dependent upon the ease with which the batteries can be recharged. There have been attempts to alleviate the problems associated with manual operations by using automated operations. However, automated methods can lead to other problems such as exposed contacts or the need for additional circuitry to retract or shield the contacts.

For example, U.S. Pat. No. 4,777,416 issued on Oct. 11, 1988, to Robert W. George II et al., describes an apparatus for charging a battery on a mobile robot. When the robot's batteries need charging, the robot travels to a charging station. Then, the charging contacts move to position themselves on the conductor bands located on the robot and charging takes place. Another example is U.S. Pat. No. 3,169,733 issued on Feb. 16, 1965, to Arthur M. Barret, Jr. Barret describes a system for charging a battery on a vehicle by moving the contacts of a battery charger and connecting them to line voltage terminals to charge the battery. The battery charger is located on the vehicle and converts the line voltage to direct current.

One problem associated with George's invention is that the conductor bands are always connected to the battery. This allows the bands to be touched by a worker possibly causing him physical harm. Another disadvantage is that the conductor bands could be shorted by an object or by metal shavings found in industrial areas, causing the batteries or the robot to be damaged. Some of the problems with George's invention are addressed by Barret's, which moves the contacts normally located inside the vehicle to a position outside of the vehicle. The disadvantage with Barret's invention is that additional circuitry is needed to provide movement of the contacts. Also, a battery charger is located on the vehicle. The battery charger along with the motor to move the contacts makes the charging system very bulky and costly. If a fleet has many vehicles it will require many chargers, where the proposed invention only requires a few chargers in opportune locations.

The present invention is directed to overcoming one or more of the problems as set forth above.

DISCLOSURE OF THE INVENTION

In one aspect of the invention, a charging system for a vehicle which includes a rechargeable battery normally connected to the vehicle motor is provided. The vehicle has a charge receiving member which is controllably connected to the battery. When the vehicle is positioned at a charging location, a charge control signal is produced. Then the vehicle motor is responsively disconnected from the battery and the charge receiving member is connected to the battery.

In another aspect of the present invention, a method for charging a vehicle which includes a rechargeable battery normally connected to the vehicle motor and a charge receiving member is provided. The method includes the steps of positioning the vehicle at a charging location to produce a charge control signal, receiving the charge control signal to disconnect the battery from the vehicle motor, and connecting the charge receiving member to the battery to charge the battery.

Problems generally associated with having the charge receiving member normally connected to the battery are eliminated by connecting the charge receiving member to the battery only when the battery is charging.

BEST MODE FOR CARRYING OUT THE INVENTION

Figure 1:
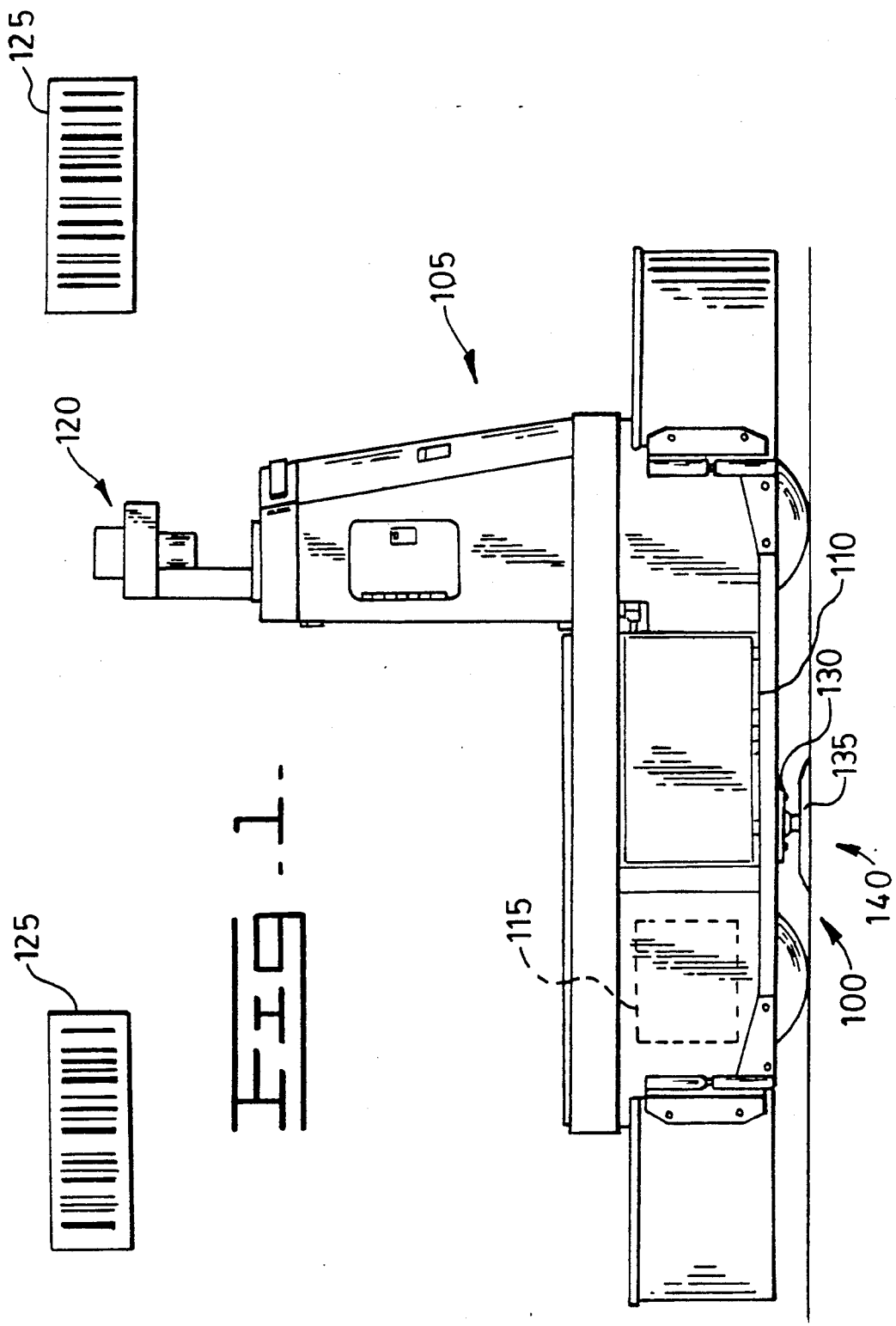
FIG. 1 is a diagrammatic side view of one embodiment of the present invention showing an automated guided vehicle with a charge receiving member attached to the frame of the vehicle and in contact with the charge delivering member.

FIG. 1 depicts a charging system 100 for a vehicle 105. The vehicle 105 includes a rechargeable battery 110 which is normally connected to a vehicle motor 115. The illustrated vehicle 105 is a driverless automatic guided vehicle and is guided by a laser guidance system which preferably includes a laser system 120 and a plurality of targets 125. The laser system 120 contains a scanning laser beam which rotates in azimuth so that it scans across the targets 125 which are within its field of view. Each target 125 contains an unique code indicating its identity. The code is formed by retro-reflective material which reflects a narrow beam in the same direction as the original source. The vehicle 105 is able to determine the precise direction of at least two targets relative to its own position and, by using triangulation techniques, the vehicle 105 is able to determine its own position relative to the targets 125.

The vehicle 105 also includes a charge receiving member 130 which is connectable to a charge producing member 135. Both members are, for example, of a construction similar to that supplied by American Powerail Inc. as part number model BLS 200 and model BLK 200 respectively. The charge receiving member 130 is connected to the vehicle 105 and is maintained substantially free from movement relative to the vehicle 105; similarly, the charge producing member 135 is maintained substantially free from movement relative to the charging location 140. The charge receiving member 130 preferably includes means such as a spring (not shown), for allowing a preselected amount of movement of the receiving member 130 to accommodate for slight deviations in elevational tolerance stack-up between the receiving member 130 and the producing member 135. The springs also maintain the receiving member 130 in contact with the producing member 135.

Figure 2:
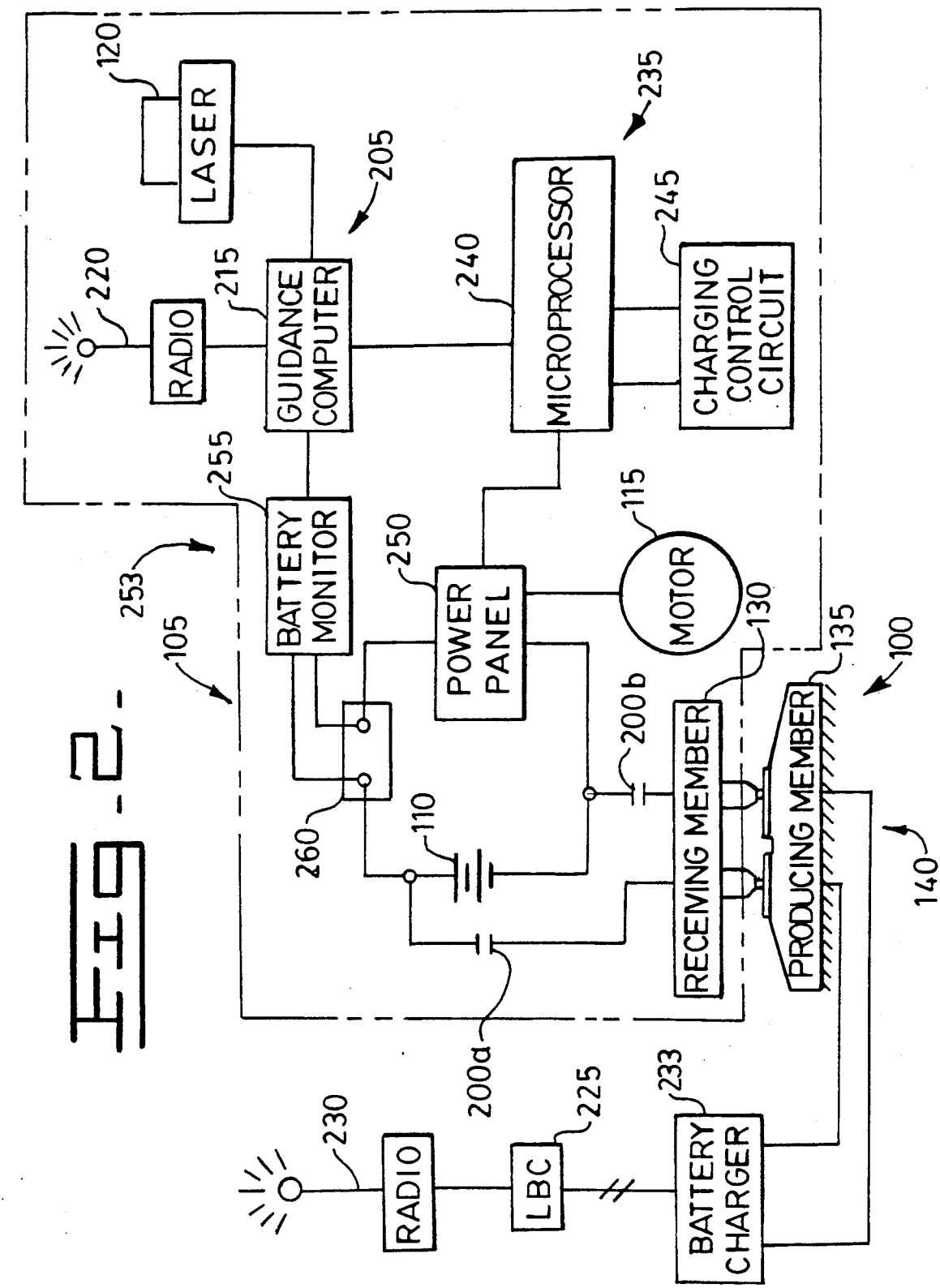
FIG. 2 is a simplified block diagram of a charging system embodying the invention; and, FIG. 3 is a detailed circuit diagram of a electrical circuit embodying the invention.

As depicted in FIG. 2, the charge receiving member 130 is controllably connected by a pair of normally open contacts 200a,200b to the battery 110. The charging system 100 includes vehicle control means 205 for positioning the vehicle 105 at a charging location 140 and producing a responsive charge control signal. The vehicle control means 205 includes, for example, a guidance computer 215 which is electrically connected to the laser system 120. The guidance computer 215 is responsible for collecting information on the current position of the vehicle 105 and is programmed with the location of every target 125 in the system. Information is extracted in electrical form from the laser system 120 and fed to the guidance computer 215 for analyzing.

The vehicle control means 205 has a RF antenna 220 for sending and receiving communication signals to a landbased computer 225. The landbased computer (LBC) 225 provides routing information and charging locations for the vehicle 105 and can simultaneously control several vehicles. The landbased computer 225 may include a plurality of microprocessors and a RF antenna 230 for sending and receiving communication signals. For example, the communication signals preferably include information concerning the location of the charging location 140 and the discharge status of the battery 110. Also, the landbased computer 225 controls the battery charger 233. The battery charger 233 has a communication port for communicating to the landbased computer 225. Typically, the battery charger 233 delivers electrical energy in the form of direct current to the charge producing member 135 when a charging signal is present.

The charging system 100 further includes logic means 235 for receiving the charging control signal produced by the guidance computer 215 and responsively disconnecting the vehicle motor 115 from the battery 110 and connecting the charge receiving member 130 to the battery 110. The logic means 235 preferably includes at least one microprocessor 240 which is used to control vehicle functions such as motor speed and vehicle direction. The microprocessor 240 is electrically connected to the guidance computer 215, the charging control circuit 245, and the power panel 250.

The power panel 250 consists of circuitry which delivers electrical power from the battery 110 to the vehicle motor 115 in response to signals delivered by the microprocessor 240. Moreover, the microprocessor 240 ultimately controls the connection of the vehicle motor 115 to the battery 110 by sending signals to the charging control circuit 245. For example, in response to receiving a charging control signal, the microprocessor 240 sends control signals to the charging control circuit 245 which responsively disconnect the vehicle motor 115 from the battery 110 and connect the charge receiving member 130 to the battery 110. The microprocessor 240 only sends control signals to connect the charge receiving member 130 to the battery 110 when the guidance computer 215 produces a charge control signal.

The vehicle 105 preferably includes battery monitor means 253 for sensing the state of charge of the battery 110 and producing a low battery signal when the battery 110 discharges below a predetermined value. The battery monitor means 253 preferably includes a battery monitor 255, for example, of a construction similar to that supplied by Hoppecke, Inc. as part number BKE 2020. The battery monitor 255 is electrically connected in parallel to the battery 110 via a shunt 260. The guidance computer 215 is electrically connected to the battery monitor 255 and receives a low battery signal corresponding to a discharged battery 110. In response to the low battery signal, the guidance computer 215 positions the vehicle 105 at the charging location 140.

Figure 3:
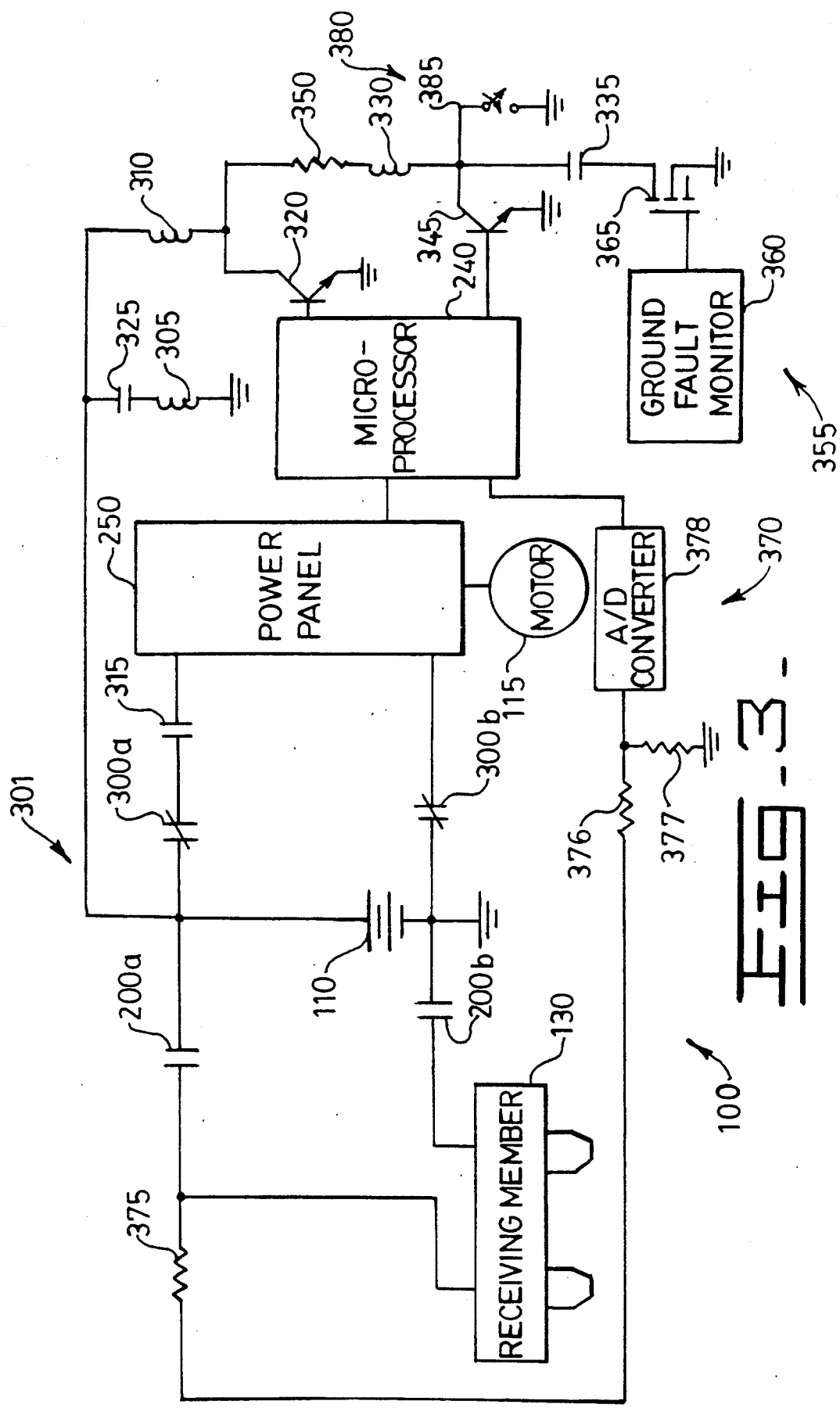

As depicted in FIG. 3, the charging system 100 includes a contactor 301 having a charging contactor coil 305 and at least first and second contacts 200a,300a. The first contact 200a is normally open and is connected between the charge receiving member 130 and the positive terminal of the battery 110. The second contact 300a is normally closed and is connected between the motor 115, via the power panel 250, and the positive battery terminal The contactor 301 also has third and forth contacts 200b,300b. The third contact 200b is normally open and is connected between the receiving member 130 and ground, and the fourth contact 300b is normally closed and is connected between the motor 115 via the power panel 250, and ground.

The contacts 200a,200b,300a,300b control which of the the motor 115 and receiving member 130 is energized. For example, in the illustrated condition the normally closed contacts 300a,300b provide for the flow of current from the battery 110 to the motor 115 via the power panel 250. Control of the pairs of contacts 200a,200b,300a,300b is effected by the energization of the charging contactor coil 305.

A line contactor coil 310 is connected between the positive terminal of the battery 110 and ground. The line contactor coil 310 controls a normally open line contact 315 which is connected between the positive battery terminal and the motor 115 via the power panel 250. The line contact 315 provides added protection against the flow of energy from the battery 110 to the motor 115 when the charge receiving member 130 is energized, as further discussed below.

Energizing the line contactor coil 310 is controlled by the microprocessor 240. A first transistor switch 320 is connected between the line contactor coil 310 and ground. More particularly, the first transistor switch 320 is a conventional npn type transistor having a collector connected to the line contactor coil 310, an emitter connected to ground, and a base connected to an output terminal of the microprocessor 240. In response to the first transistor switch 320 being in the nonconductive state, the line contactor coil 310 is deenergized and, responsively the line contact 315 is in the open position. In order to provide power to the motor 115 the first transistor switch 320 must be in the conductive state energizing the line contactor coil 310 which will close the line contact 315.

The charging contactor coil 305 is connected between the positive battery terminal through a charge control switch 325 and ground. Preferably, the charge control switch 325 is a fifth contact which is normally open. The charge control switch 325 is controlled by a third contactor coil 330 which also controls a sixth contact 335. The third contactor coil 330 is connected between the line contactor coil 310 and the sixth contact 335. The sixth contact 335 is connected in series between the third contactor coil 330 and ground through a third transistor switch 365.

A second transistor switch 345, allows for energization of the third contactor coil 330. Typically, the second transistor switch 345 is of a construction similar to that of the first transistor switch 320, having a collector connected to the third contactor coil 330, an emitter connected to ground, and a base connected to an output terminal of the microprocessor 240. The microprocessor 240 thus controls the energization of the third contactor coil 330.

A limiting resistor 350 is connected in series between the line contactor coil 310 and the third contactor coil 330. The limiting resistor 350 limits the current flow through coils 310 and 330 preventing the line contactor coil 310 from becoming energized when the first transistor switch 320 is in the nonconducting state and the second transistor switch 345 is in the conducting state. The coils are selected such that coil 330 needs less current to energize than does coil 310, additionally coil 330 is rated at a lower voltage level than coil 310.

A detecting means 355 senses a ground fault indicating a connection between a battery terminal and the vehicle frame and responsively disconnects the charge receiving member 130 from the battery 110. The detecting means 355 preferably includes a ground fault monitor 360 and a third transistor switch 365. Ground fault detections units are common in the industry, such as those made by Sloan Power Electronics Ltd model no. 2AK0003.

The third transistor switch 365 allows for deenergization of the third contactor coil 330. Typically, the third transistor switch 365 is of a construction similar to that of a typical n-channel MOSFET type transistor having a drain connected to the sixth contact 335, a source connected to ground, and a gate connected to an output terminal of the ground fault monitor 360. For example, when the ground fault monitor 360 senses an abnormal ground condition the ground fault monitor 360 sends a "low" signal to the gate of the third transistor switch 365 causing the third transistor switch 365 to be in the nonconductive state and the third contactor coil 330 to be deenergized.

Moreover, the ground fault monitor 360 is electrically connected to the microprocessor 240 and delivers signals to the microprocessor 240 responsive to the status of ground conditions. In response to an abnormal ground fault condition, the microprocessor 240 sends a signal notifying the guidance computer 215 of the abnormal ground condition.

The logic means 235 also includes sensing means 370 for producing a "warning" signal in response to detecting a voltage potential on the charge receiving member 130 when the vehicle 105 is not charging. The logic means 235 automatically disconnects the motor 115 from the battery 110 in response to receiving the "warning" signal. In the preferred embodiment, the sensing means 370 includes a second resistor 375 connected between the receiving member 130 and the microprocessor 240 through a third resistor 376 and an analog to digital voltage converter (A/D converter) 378. A fourth resistor 377 is connected between the junction of the third resistor 376 and the A/D converter 378, and ground. Typically, the A/D converter 378 will change the voltage level found across the fourth resister 377 to a corresponding digital value, in a manner that is well known in the art. The microprocessor 240 continuously monitors the voltage on the A/D converter 378 and delivers a "low" signal to the first transistor switch 320, causing the line contactor coil 310 to deenergize and opening the line contact 315, when a voltage exists on the fourth resistor 375.

The charging system 100 also includes switching means 380 for manually connecting the charge receiving member 130 to the battery 110. Preferably, the switching means includes a key switch 385 connected between the third contactor coil 330 and the sixth contact 335 and ground in parallel with the second transistor switch 345. The key switch 385 allows an operator to manually control the energization of the second contactor coil 330.

Industrial Applicability

Operation of the invention is best described in conjunction with its use in a typical industrial application. In the operation of the charging system 100, a vehicle 105 has an associated charging location 140 which include a battery charger 233 and a charge producing member 135 for delivering electrical energy to the vehicle 105. The vehicle 105 is, for example, a driverless automatic guided vehicle. The vehicle 105 is driven by one or more electric motors 115 and is powered by energy stored in a rechargeable battery 110. The vehicle 105 also has a charge receiving member 130 for passing electrical energy to the battery 110, and additional control components according to the above description of the embodiment of the invention.

When the vehicle 105 is neither in operation nor being charged, both the motor 115 and the charge receiving member 130 are disconnected from the battery 110. The microprocessor 240 sends "low" signals to both the first and second transistor switches 320,345. This causes both transistor switches 320,345 to be in the nonconductive state which responsively deenergizes the line contactor coil 310 and the third contactor coil 330. The line contactor coil 310 controls the normally open line contact 315, while the third contactor coil 330 controls the normally open charge control switch 325. When the charge control switch 325 is open the charging contactor coil 305 is deenergized. The charging contactor coil 305 controls the normally open contacts 200a,200b and the normally closed contacts 300a,300b. Contacts 200a,200b pass electrical energy from the receiving member 130 to the battery 110; while contacts 300a,300b pass electrical energy from the battery 110 to the motor 115 via the power panel 250.

In response to the vehicle 105 being in an operational mode, the microprocessor 240 provides a "low" signal to the second transistor switch 345 and a "high" signal to the first transistor switch 320. Responsively, the line contactor coil 310 is energized and the line contact 315 is closed. Since the third contactor coil 330 is deenergized, the charge control switch 325 is open allowing the charging contactor coil 305 to deenergize. Accordingly, contacts 200a,200b are open and contacts 300a,300b are closed. Therefore, the battery is able to delivery energy to the motor 115 via the power panel 250.

Battery condition is continuously evaluated by the battery monitor 255, which monitors battery current to determine when the battery 110 has discharged below a predetermined level. In response to the battery monitor 255 sensing a discharged battery 110, the guidance computer 215 sends a low battery signal, along with the vehicle's coordinates, to the landbased computer 225. The landbased computer 225 locates the nearest charging location 140 and sends the route of the closest charging location 140 to the vehicle 105. The vehicle 105 guides itself to the charging location 140 using the laser guidance system.

When the vehicle 105 engages the charge receiving member 130 to the charge producing member 135, the guidance computer 215 sends a charging signal to microprocessor 240. Accordingly, the microprocessor 240 produces a "low" signal to the first transistor switch 320 and a single "pulse" signal to the second transistor switch 345. In response to the first transistor switch 320 being nonconductive the line contactor coil 310 becomes deenergized and the line contact 315 opens. In contrast, the second transistor switch 345 becomes conductive allowing the third contactor coil 330 to energize. The third contactor coil 330 controls the normally open sixth contact 335 which responsively closes, allowing a path for current to travel to ground. Also the charge control switch 325 responsively closes, allowing the charging contactor coil 305 to energize. Simultaneously, the second and fourth contacts 300a,300b open, and the first and third contacts 200a,200b close providing a connection between the receiving member 130 and the batterY 110, and disconnecting the motor 115 from the battery 110. The line contactor coil 310 and the third contactor coil 330 are selected such that a larger amount of current is needed to energize the line contactor coil 310 than the third contactor coil 330. The current is limited by the limiting resistor 350 and the third contactor coil 330.

After the microprocessor 240 produces the "pulse" signal, the guidance computer 215 sends information to the landbased computer 225 that the vehicle 105 is ready to receive a charge. Then the landbased computer 225, which also controls the battery charger 233, allows the battery charger 233 to produce electrical current. Recharge current is monitored by the battery charger 225 to determine when the battery 110 is sufficiently charged. Once the battery 110 has reached a sufficient level of charge, the battery charger 233 produces a trickle charge current, and responsively sends a signal to the landbased computer 225 that the vehicle 105 is charged. The vehicle 105 charges until the landbased computer 215 finds work for the vehicle 105.

When the guidance computer 215 receives a task from the landbased computer 225, the guidance computer 215 sends a signal to the microprocessor 240 to energize the first transistor switch 320. Responsively, the microprocessor 240 produces a "high" signal to the first transistor switch 320. Additionally, the line contactor coil 310 becomes energized and the third contactor coil 330 becomes deenergized. Simultaneously, the first and third contacts 200a,200b open and the second and fourth contacts 300a,300b close. The battery 110 is now connected to the motor 115 via the power panel 250.

In response to a ground fault being detected during charging, the ground fault monitor 360 sends a "low" signal to the third transistor switch 365. While the third transistor switch 365 is nonconductive, the current has no path to ground. Since there is no current path, the third contactor coil 330 becomes deenergized, responsively opening both the sixth contact 335 and the charge control switch 325. The charging contactor coil 305 becomes deenergized and the first and third contacts 200a,200b open and the second and fourth contacts 300a,300b close. Therefore, the battery 110 is no longer connected to the receiving member 130 and the battery 110 is also not connected to the motor 115, since the line contact 315 is open during charging.

When the vehicle 105 is traveling, the microprocessor 240 is continuously monitoring the voltage potential on the receiving member 130. In response to the microprocessor 240 detecting a voltage potential on the receiving member 130, the microprocessor 240 produces a "low" signal to the first transistor switch 320. Responsively, the line contactor coil 310 is deenergized and the line contact 315 opens. Hence, the battery 110 is disconnected from the motor 115.

If the battery 110 needs charging when the microprocessor 240 is not in control of the third switching means 345, the key switch 385 provides the vehicle 105 a manual method of charging the battery 110. Typically, an operator will position the key switch 385 for a connection to ground for an instant, allowing a path for current. Responsively the third contactor coil 330 is energized, allowing the sixth contact 335 to close and the charge control switch 325 to close. Accordingly, the charging contactor coil 305 is energized. Simultaneously, the second and fourth contacts 300a,300b open and the first and third contacts 200a,200b close.

The charging contactor coil 305 along with the first, second, third, and fourth contacts 200a,300a,200b, and 300b allows only the motor 115 or the receiving member 130 to be connected to the battery 110 but not both. This prevents the receiving member 130 from having any voltage potential while the vehicle 105 is in operation. Therefore, no dangerous condition arises caused by the receiving member 130 having a voltage potential. In addition, the charging control circuit 245 is of simple construction and is composed of relatively inexpensive components.

Other aspects, objects, advantages, and uses of this invention can be obtained from a study of the drawings, the disclosure, and the appended claims.

We claim:

1. A charging system having a charging location for a vehicle, said vehicle including a rechargeable battery normally controllably connected to a vehicle motor, comprising:
   a charge receiving member controllably connectable to said battery;
   means for determining the position of said charging location;
   vehicle control means for positioning said vehicle based on said determined position at said charging location and producing a responsive charge control signal; and
   logic means for receiving said charge control signal and automatically disconnecting said vehicle motor from said battery, and connecting said charge receiving member to said battery in response to receiving said charge control signal, and thereafter charging said vehicle battery.

2. A charging system as set forth in claim 1, wherein said charge receiving member is disconnected from said battery except when said charge control signal is present.

3. A charging system as set forth in claim 1, wherein said charge receiving member is connected to said vehicle and is maintained substantially free from movement relative to said vehicle.

4. A charging system as set forth in claim 1, wherein said charging location includes a charge producing member connectable to said charge receiving member and maintained substantially free from movement relative to said charging location.

5. A charging system as set forth in claim 1, wherein said vehicle includes a battery monitor means for sensing the state of charge of said battery and producing a low battery signal in response to the state of charge being less than a predetermined value, and said vehicle control means receives said low battery signal and responsively positions said vehicle at said charging location.

6. A charging system as set forth in claim 1, wherein said vehicle includes a detecting means for sensing a ground fault connection and responsively disconnecting said charge receiving member from said battery.

7. A charging system as set forth in claim 1, wherein said vehicle includes switching means for manually connecting said charge receiving member to said battery.

8. A charging system for a vehicle, said vehicle including a rechargeable battery normally controllably connected to a vehicle motor, comprising:
  a charge receiving member connected to said vehicle;
  a battery having positive and negative terminals, said negative terminal being connected to ground;
  a contactor having at least first and second contacts, said first contact being normally open and being connected between said charge receiving member and said positive terminal of said battery and said second contact being normally closed and being connected between said motor and said positive battery thermal.

9. A charging system as set forth in claim 8, including a charging contactor coil to control said contacts and a normally open charge control switch, said charging contactor coil having first and second ends, said first end being connected to said positive battery terminal through said charge control switch and said second end being connected to ground.

10. A charging system as set forth in claim 9, wherein said contactor also includes third and fourth contacts, said third contact being normally open and being connected between said receiving member and ground and said fourth contact being normally closed and being connected between said motor and ground.

11. A charging system as set forth in claim 8, wherein said charge receiving member is maintained substantially free from movement relative to said vehicle.

12. A charging system as set forth in claim 8, including a battery monitor connected between said positive terminal of said battery and at least one of said first and second contacts.

13. A charging system as set forth in claim 8, including a charging location having a charge producing member, said charge producing member being maintained substantially free from movement relative to said charging location.

14. A method for charging a vehicle at a charging location, said vehicle including a rechargeable battery controllably connected to a vehicle motor and a charge receiving member, comprising the steps of:
  determining the position of said charging location;
  positioning said vehicle based on said determined position at said charging location and producing a responsive charge control signal; and
  receiving said charge control signal and automatically disconnecting said vehicle motor form said battery, and connecting said charge receiving member to said battery in response to receiving said charge control signal, and thereafter charging said vehicle battery.

15. A method, as set forth in claim 14, including the step of sensing an abnormal ground connection during charging and responsively disconnecting said charge receiving member from said battery.

16. A method, as set forth in claim 14, including the steps of sensing a voltage potential on said charge receiving member and automatically disconnecting said motor from said battery when said vehicle is not charging.

17. A charging system having a charging location for a vehicle, said vehicle including a rechargeable battery normally controllably connected to a vehicle motor, comprising:
  a charge receiving member controllably connectable to said battery;
  vehicle control means for positioning said vehicle at said charging location and producing a responsive charge control signal;
  sensing means for producing a warning signal in response to detecting a voltage potential on said charge receiving member when said vehicle is not charging; and
  logic means for receiving said charge control signal and responsively disconnecting said vehicle motor from said battery and connecting said charge receiving member to said battery, and receiving said warning signal and automatically disconnecting said motor from said battery in response to receiving said warning signal.

18. A method for charging a vehicle, said vehicle including a rechargeable battery controllably connected to a vehicle motor and a charge receiving member, comprising the steps of:
  positioning said vehicle at a charging location and producing a responsive charge control signal;
  receiving said charge control signal and responsively disconnecting said battery from said vehicle motor and connecting said charge receiving member to said battery;
  sensing an abnormal ground connection during charging and responsively disconnecting said charge receiving member from said battery; and
  sensing a voltage potential on said charge receiving member and automatically disconnecting said motor from said battery when said vehicle is not charging.

19. A charging system having a charging location for a vehicle, said vehicle including a rechargeable battery normally controllably connected to a vehicle motor, comprising:
  a charge receiving ;emmber controllably connectable to said battery;
  vehicle control means for producing a charge control signal in response to said vehicle being at said charging location;
  logic means for receiving said charge control signal and for responsively producing a pulse signal and disconnecting said vehicle motor from said battery; and
  charging control means for receiving said pulse signal and responsively connecting said charge receiving member to battery.

* * * * *